No. 706,248. Patented Aug. 5, 1902.
N. MERCHES.
DRAFT ATTACHMENT.
(Application filed Apr. 15, 1902.)
(No Model.)
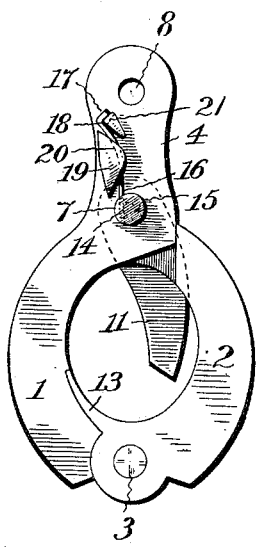
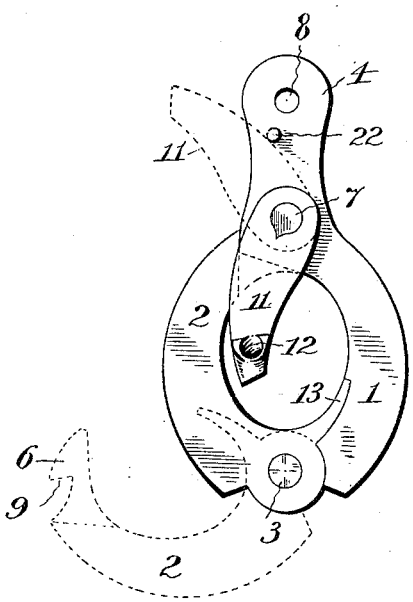
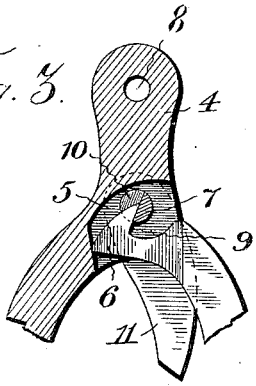
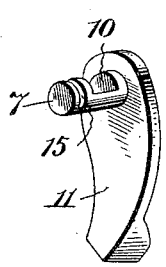
WITNESSES
Jas. E. Hitchinson
E. Kiner
INVENTOR
Nicholas Merches,
by Swift and Co., Attorneys.

UNITED STATES PATENT OFFICE.

NICHOLAS MERCHES, OF OLDHAM, SOUTH DAKOTA.

DRAFT ATTACHMENT.

SPECIFICATION forming part of Letters Patent No. 706,248, dated August 5, 1902.

Application filed April 15, 1902. Serial No. 103,030. (No model.)

*To all whom it may concern:*

Be it known that I, NICHOLAS MERCHES, a citizen of the United States, residing at Oldham, in the county of Kingsbury and State of South Dakota, have invented a new and useful Draft Attachment; and I do hereby declare the following to be a full, clear, and exact description of the invention, such as will enable others skilled in the art to which it appertains to make and use the same.

The invention relates to a draft attachment; and it has for its object to provide a simple, inexpensive, and efficient device designed to be employed for hauling and hoisting loads and the like and adapted to enable a load to be readily deposited at any desired point.

A further object of the invention is to provide a device of this character adapted to be employed for securing boats and the like and capable of enabling a rope or cable to be quickly and positively detached when desired.

The invention consists in the novel construction and arrangement of parts hereinafter described and shown, and particularly pointed out in the claims hereto appended.

In the drawings forming part of this specification, and in which like numerals of reference designate corresponding parts, Figure 1 is an elevation of a draft attachment constructed in accordance with this invention and shown closed. Fig. 2 is a similar view of the opposite side of the device, the same being shown open in dotted lines. Fig. 3 is a detailed sectional view of the device, illustrating the manner of locking the same. Fig. 4 is a detailed view of the lever.

Referring to the drawings, 1 and 2 designate sections of a draft attachment, which sections are hinged together at one end of the device by means of a pivot 3, passing through suitable eyes or ears of the members or sections 1 and 2. The sections 1 and 2 are oppositely curved to form an approximately circular opening for the reception of a link, ring, bail, or the like to connect the load to the device; but the draft attachment is also adapted to be employed on a rope, cable-chain, or other connections for enabling the same to be attached to a suitable anchoring device, such as a post or the like, and it will enable the same to be quickly disconnected therefrom when desired.

The section 1 is provided with a shank 4, located at the end of the device opposite that at which the pivot is located and provided at its inner end with a recess 5 for the reception of a catch 6 of the adjacent end of the other section 2, the catch 6 being formed by reducing the end of the section 2 and being adapted to extend into the recess to be engaged by a rotary locking pin or pivot 7. The shank 4 is also provided at its outer end with an aperture 8 to enable it to be connected with the draft or hoisting mechanism. The catch 6, which is beveled, as shown, is provided at its outer edge with a recess forming a shoulder 9, which is adapted to be engaged by the locking-pin 7, which is journaled in a suitable opening at the inner end of the shank 4. The locking-pin is provided between its ends with a recess or cut-away portion 10, forming a flat face, which is adapted when the locking-pin is rotated to be carried into and out of engagement with the shoulder 9 of the catch 6. The locking-pin is operated by means of a lever 11, secured to one end of it, and provided at the outer end, which is enlarged, with an opening 12 for the attachment of a trip-cord (not shown) designed to be run over a suitable guide or pulley for enabling it when pulled to swing the lever outward for releasing the section 2, whereby the tension or strain on the same will automatically swing it open. The section 2 is provided at its hinged end with an arm 13, overlapping a portion of the section 1 and adapted when the section 2 is swung outward to carry the part engaged by the attachment out of the same. The hinged section is adapted to be readily closed, and it is locked in such position by swinging the lever inward to the position shown in Fig. 1 to carry the locking-pin into engagement with the catch. The locking-pin is provided at its outer end with a notch or recess forming opposite shoulders or faces 14 and 15, which are adapted to be engaged by the free end of a spring 16, and the latter is secured at its other end, which is provided with an arm 17, by means of lugs 18 and 19, formed integral with the shank 4 and spaced apart to receive the spring and provided with oppositely-disposed recesses or notches 20 and 21, in which the spring is held when placed under tension. The spring by engaging the faces 14 and 15 of the locking-pin is adapted to hold the same and the lever against accidental movement, whereby the locking-pin is held in and out of engagement with the catch of the hinged section 2 of the attachment. The spring is held against longitudinal movement by frictional engagement with the lugs and by the arm 17, which engages the notch or recess at the outer end of the lug 21 of the shank 4. The outward swing of the lever is limited by a projection 22 of the shank.

From the foregoing it will be clear that the draft attachment, which may be constructed of any size and strength to adapt it to the use to which it is to be put, is exceedingly simple and inexpensive in construction, that it is adapted to be used in hauling and hoisting loads and in hitching or fastening boats and the like, and that it is capable of enabling a load to be readily deposited at the desired point without interfering with or affecting the movement of the hoisting or draft mechanism.

What I claim is—

1. A draft attachment comprising sections 1 and 2, hinged together at one end of the attachment, a rotary locking-pin mounted on the section 1 and provided between its ends with a cut-away portion, arranged to engage the section 2, an exterior lever connected with one end of the locking-pin and adapted to operate the same, and a spring engaging the other end of the locking-pin, substantially as described.

2. A draft attachment, comprising the section 1 provided with a recess at one end and having an opening intersecting the recess, the section 2 hinged to the other end of the section 1 and provided with a catch, arranged in the recess when the attachment is closed, a rotary locking-pin mounted in the opening of the section 1 and provided with means for engaging the catch and having a recess at one end, a lever, connected with the other end of the locking-pin and a spring mounted on the section 1 and engaging the recess of the locking-pin and holding the latter against movement and retaining the same in the opening, substantially as described.

3. A draft attachment, comprising the section 1 having a shank provided with lugs, spaced apart and having recesses, a spring, arranged between the lugs and engaging the recesses thereof, the section 2 hinged to the section 1, a locking-pin mounted on the section 1 and arranged to engage the section 2 to hold the same closed and engaged by the said spring and means for operating the locking-pin, substantially as described.

In testimony whereof I have hereto affixed my signature in the presence of two witnesses.

NICHOLAS MERCHES.

Witnesses:
  I. L. HAYS,
  B. F. CORDS.